Nov. 20, 1934.  S. L. WEISS  1,981,765
VAPORIZER
Filed Aug. 6, 1931  2 Sheets-Sheet 1
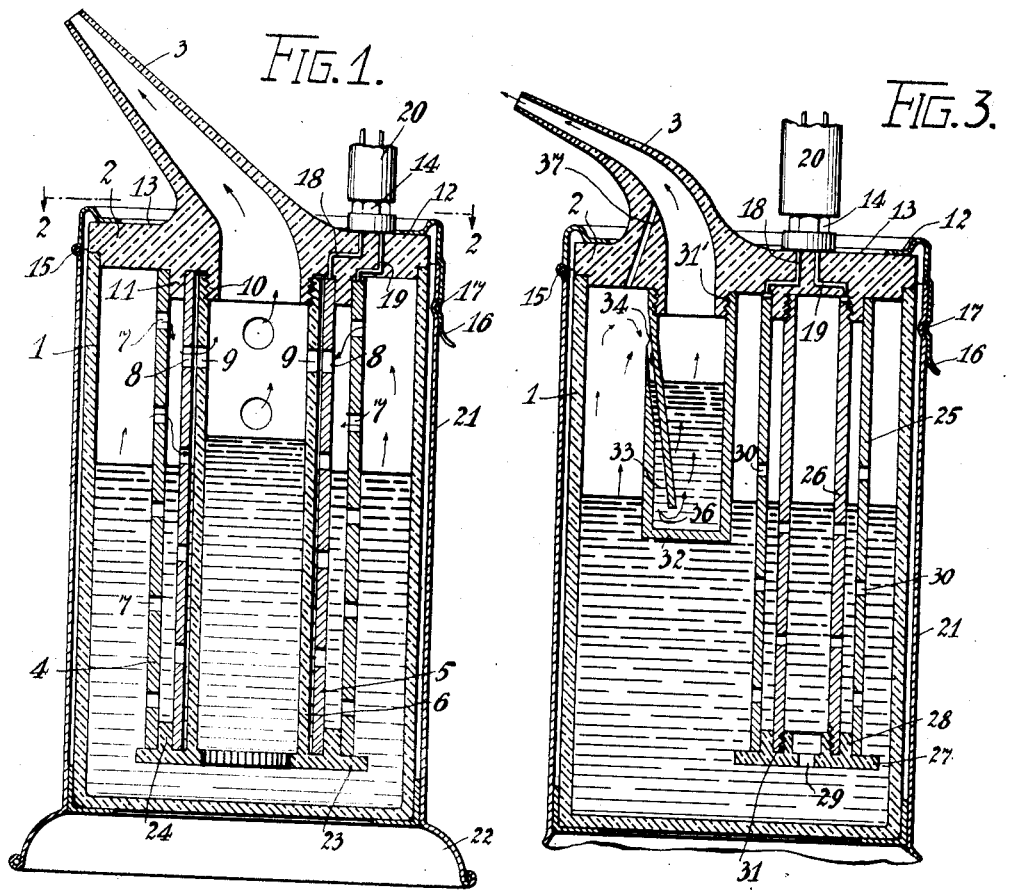
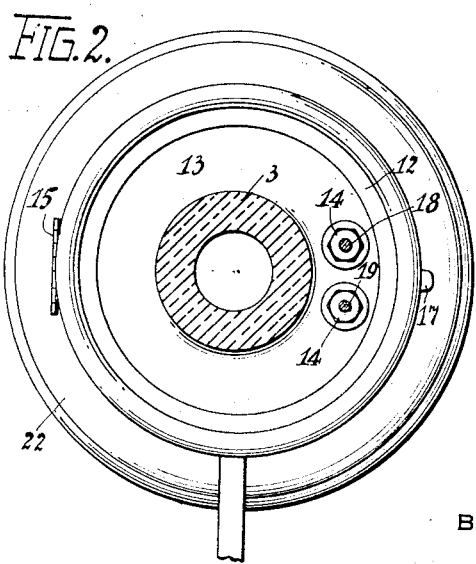
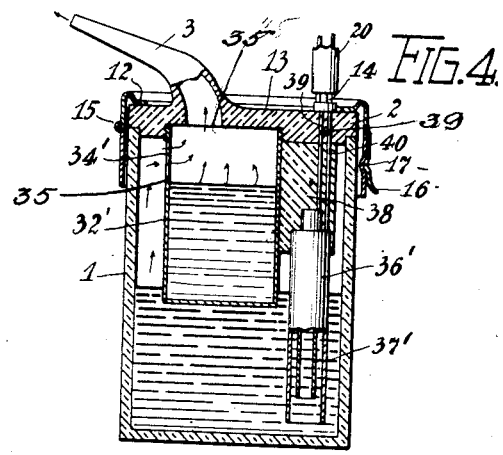
INVENTOR
SAMUEL L. WEISS
BY his ATTORNEYS
Mason, Fenwick & Lawrence

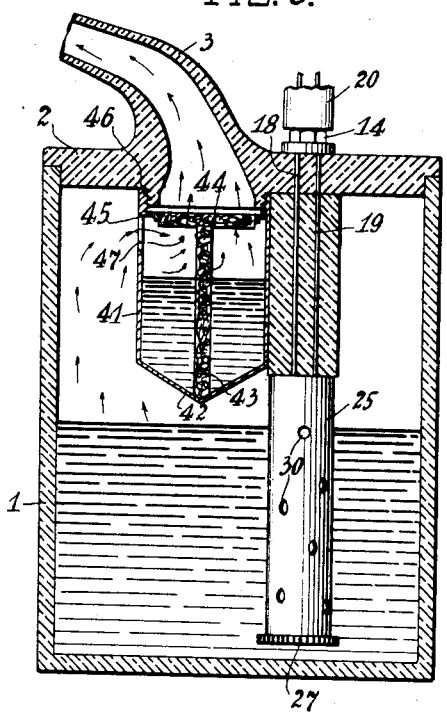
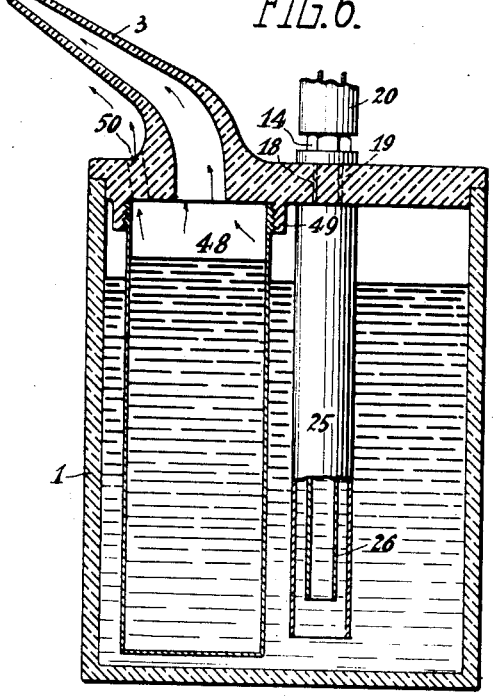
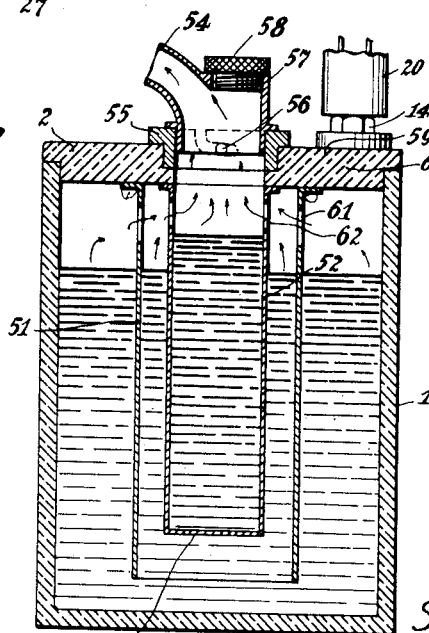

Patented Nov. 20, 1934

1,981,765

UNITED STATES PATENT OFFICE 1,981,765

VAPORIZER

Samuel L. Weiss, Brooklyn, N. Y.

Application August 6, 1931, Serial No. 555,611

7 Claims. (Cl. 219—40)

This invention relates to improvements in vaporizers and has more particular relation to vaporizers of the "plug in" or electric type intended for household use.

The invention is an improvement on Patent No. 1,797,457—Herman Weiss—issued March 24, 1931.

The object of the invention is to provide an electric vaporizer of the safety type in which the medicine to be vaporized is contained in a vessel independent of that containing the heating elements which are submerged in water or other liquid.

Another object of the invention is to provide an electric vaporizer with a water chamber and an independent chamber for the medicine to be vaporized, and to provide means for mingling the vapors arising from the two chambers.

A further object of the invention is to provide an electric vaporizer in which the medicine to be vaporized is kept free of the heating elements so as not to be evaporated in contact with these heating elements.

A further object of the invention is to provide an electric vaporizer of the heating element water type in which the medicine is contained within one of the heating elements or electrodes.

The invention also has other objects, all of which will be hereinafter more particularly set forth and claimed.

In the accompanying drawings forming part of this specification,

Figure 1 represents a central vertical section through the vaporizer embodying my invention.

Figure 2 represents a top plan view of the same on the line 2—2 of Figure 1.

Figure 3 is a central vertical section through a modified form of my improved electric vaporizer.

Figure 4 represents a central vertical section through another modified form of my invention, and Figures 5, 6 and 7 represent respectively central vertical sections through other modified forms of my invention.

Described in general terms, the present invention seeks to improve upon such forms of vaporizers as are shown in the above mentioned patent in which the medicated water is in direct contact with the heating elements and because of this fact and the further fact that the liquid in devices of this kind often is evaporated to a very low point, the medicine contained within the liquid tends to become solidified and attach itself to the heating elements in the form of encrustations which continue to increase in size until they interfere with the action of the elements of the heating device and even short circuit them.

Heretofore such an action has necessitated the frequent cleaning of the electrodes of the heating element to prevent the accumulation of these encrustations.

In the form of electrodes that applicant desires to use, that is nested electrodes, it is almost next to impossible to remove these encrustations, as the parts are nested one within the other, and it is very difficult to insert the proper tool for scraping off the medicine encrusted on them.

By reference to Figure 1, which covers one form of my improved vaporizer, 1, represents the containing vessel preferably of glass, 2, the cover for the same, 3, the vapor spout, 4, the cylindrical outer electrode of the heating element, 5, the nested inner electrode of the heating element, and 6, the innermost cylindrical medicine container which not only communicates with the spout, 3, but by means of passages, 7, formed in the outer cylinder, 4, and further passages, 8 and 9, formed in the inner cylinder, 5, and the receptacle, 6, also communicates with the air space of the receptacle 2 to receive steam or vapor therefrom.

The medicine receptacle 6 is screw-threaded at its upper end as at 9 to screw on to a screw-threaded ring 10 formed pendent from the top 2. This top 2 is also formed with an annular ring 11 by means of which the electrodes 4 and 5 are swedged into permanent connection with the top 2. The top 2 rests upon the upper edge of the jar 1 and is held down in position by a hinged frame 12 which is provided with a central opening 13 through which the spout 3 and the attaching contacts 14 pass.

The frame 12 is hinged as at 15 and is provided at the opposite side with a spring tongue 16 which snaps into a depression 17 formed in the vessel 2 to hold the frame closed and hold the top 2 down tight upon the upper edge of the vessel 1. The electric connectors 14 are mounted upon the top of the top 2 and are connected by suitable internal wires 18 and 19 to the respective inner electrode 5 and outer electrode 4. The attaching plug 20 which is connected to a source of current, is slipped on or off the connectors 14 in a manner well known in the art. The pivotal location of the frame 12 is such that it cannot be opened to release the top 2 until the attaching plug 20 is first removed. By this means it is impossible to remove the top 2 until after the attaching plug 20 has been first removed. This structure is fully covered in the prior patent mentioned above.

The jar or vessel 1 is mounted within a suitable metal frame 21 having a base 22 so as to prevent injury to the jar. This also is fully described in the patent mentioned above.

The medicine container 6 is provided at the bottom with a head 23 and a flange 24, the latter being so located as to pass up between the electrodes to keep them properly spaced at their lower free ends. This inner medicine container is, of course, made of an insulating material such as hard rubber, bakelite, or the like so as not to short circuit in any way the electrical connection between the two electrodes. When it is desired to replace the medicine in the receptacle 6, the device is first removed from the jar 1, and by means of the head 23, the medicine receptacle is unscrewed from within the electrodes and after being filled screwed back in place again, care being taken not to spill the medicine out of the apertures 9 which are located in the top walls of the receptacle, to permit of the passing of steam from the outer receptacle 1 into the spout 3 to be discharged.

It will be understood that in electric heating elements of this nature, the current passing through the water in the outer receptacle 1 from one of the electrodes 4—5 to the other, causes the water to become rapidly heated and the electrodes themselves to also become rapidly heated. This heat imparted to the inner chamber 6 effects the vaporization of the medicine contained in this chamber and this vapor arising into the spout 3 is mingled with the steam arising from the water in the outer receptacle and which enters the spout through passages 7, 8 and 9 as aforesaid.

With a structure of this nature, it is not possible for the medicine to come into contact with the electrodes and for this reason no encrustation of the electrodes can take place as they are only surrounded by clear water. The very difficult cleaning of nested electrodes of this type is thus obviated, as pure water forms no encrustation on the electrodes. Further, the control of the amount of medicine to be used and the proper proportions or strength of the vapor may be more readily determined in this manner than if the medicine were combined with the water and the two vaporized together.

The formation of the apertures 7 and 8 in their respective electrodes also permits a free circulation of the water through the spaces between the electrodes and the inner receptacle so that no steam pockets or traps will occur that might result in all of the water being forced out of the spaces between the electrodes themselves and between the inner electrode and the medicine receptacle.

It will, of course, be understood that the inner medicine receptacle 6 might be made of metal if desired, in which event the head 23 would only extend far enough to contact with the inner electrode 5, and would not touch the outer electrode 4 at all, thus avoiding any short circuit at this point.

Further, it will be understood that by the peculiar construction of applicant's medicine container, the medicine does not in any wise influence or contaminate the water contained in the outer receptacle and that such a vaporizer may be used in hospitals and other sick rooms in situations where it is desirable to change the medicine being administered in any one machine by simply screwing out the inner medicine receptacle and screwing in another with another different medicine in it. This will, of course, obviate any thorough cleaning of the outer jar 1 such as would be necessary if the medicine were in the outer jar.

In the modified form of my invention shown in Fig. 3, the nested electrodes 25 and 26 are mounted practically the same as shown in Figure 1, and a cap 27 of insulating material screwed upon the inner electrode and having a flange 28 for holding the lower ends of the electrode properly spaced so that they cannot come into contact with each other through extreme heat or warping. The cap 27 is provided with a central passage 29, and the electrodes are provided with apertures 30 so that there will be a free circulation of water in and around the electrodes. In this particular form of the invention, a cover is provided with a screw-threaded pendent nipple 31'. On this nipple is screwed a rubber or bakelite medicine chamber 32, this chamber being provided with an interior opening 33 extended from an aperture 34 in its outer wall to an opening 36 in its inner wall. The medicine is placed in the chamber 32 and when the current is turned on, and the water in the outer receptacle reaches a steaming stage, the steam enters the aperture 34, passes through the tube 33, through the medicine in the chamber 32, and out at the aperture 36 and arises through the medicine, picking up or absorbing a load of medicated vapor which vapor passes upward and out of the spout 3. By this means, the medicine is kept entirely separate from the heated water in the outer receptacle but the steam from this heated water is passed bodily through the medicine so that it becomes impregnated with the vapors of the medicine.

After the jar has been used and is allowed to cool, a vacuum will, of course, form within the jar 1. If any medicine remains in the chamber 32, this vacuum would tend to draw the medicine from the chamber 32 out into the chamber 1, and mix with the water. This, of course, would be very undesirable, and to obviate such result, I have provided the cover 2 with a vent or passage 37. This vent or passage breaks any vacuum that might tend to form in the outer chamber and prevents the siphoning of the medicine from the inner to the outer chamber. As the passage 37 opens into the spout 3, a small amount of steam also passes into the spout from the receptacle 1 during the treatment, this steam also mixing with the medicated vapor, but as the size of this passage is restricted, the main body of the steam passes through the pipe 33, through the medicine in the chamber 32, and out at the spout 3.

In this particular modification shown in Figure 3, it will be seen that the medicine is contained in an entirely separate chamber from the chamber containing the water and electrodes. The other parts shown in Figure 3 are similar to those shown in Figure 1. The electrodes 25 and 26 in this modification as before explained, are spaced by the annular flange 28 and the cap 27 carrying this flange is screwed as at 31' and engages screw threads upon the inside of the inner electrode 26 to hold the cap in position.

In the modified structure shown in Figure 4, I make provision for thoroughly mixing in equal proportions the steam arising from the medicine in the medicine chamber 34' screwed into the top 2 and the steam arising from the contents of the jar 1. I secure this result in this modified form by providing the top of the chamber 34' with a large opening 35 through which the steam passes above the surface of the medicine in this chamber. In this particular instance the steam is not compelled to pass down through the medicine as in the structure shown in Figure 3, but mingles with the steam arising from the heated medicine just as it does in the structure shown in Figure 1.

The electrodes 36' and 37' are arranged in a block 38 pendent from the cover 2 and connected by wires 39 and 40 to the attachment contacts 14 at the top. In this particular modified form the contents of the chamber 34 are heated by the water in the outer chamber 1 and this heating continues until the medicine has reached a boiling point, when the steam thrown off is thoroughly mixed with the steam from the outer chamber, passing out in the spout 3 through the large orifice 35.

In the modification shown in Figure 5, I provide practically the same structure as shown in Figure 3 with the exception that the medicine chamber 41 has a conical bottom 42. Arising from the lowest point in this bottom is a wick 43, this wick connecting at its top with a horizontal wick disc 44 made of fibrous material. This wick disc is held in position by a ring 45 forming part of the chamber 41. The chamber 41 is detachably supported by screw threads 46 on the under side of a ring formed in the top 2 so that the chamber may be filled with medicine and then screwed into position on the under side of the top, just as it is in the remaining modified forms.

In this particular instance, the steam from the outer chamber discharges through an aperture 47 in the medicine chamber and this steam, together with the vapors arising from the heated medicine in the chamber 41, arise and pass through the fibrous washer 44 which is saturated with medicine. This brings the heated vapors into such intimate contact on an extended area with the medicine as to cause the heated vapors to escape from the nozzle 3 with a super-saturation of medicine.

The connections of the other parts, some of which are not shown, are practically the same as shown in Figures 1 and 3.

In the modified form shown in Figure 6, the electrodes are practically the same as shown in Figure 5, but the medicine chamber provided in this form is in the shape of a long tube 48 open at its upper end and screw-threaded to detachably engage a screw-threaded flange 49 formed on the under side of the top. This structure brings the medicine chamber well down in the heated water of the outer chamber so as to take on the heat of this outer chamber.

In this particular modification only the vapors arising from the hot medicine are discharged into the spout 3. The steam, however, discharged from the hot water in the outer receptacle passes out through a discharge passage 50 formed in the top so that it may be discharged in proximity to the spout 3, whereby the patient by a slight movement of the head may either inhale the heavily laden vapors from the spout or the warm soothing water vapor from the passage 50 or both.

Finally, in the modified form shown in Figure 7, the nested electrodes 51 and 52 are secured permanently to the bottom of the top, the inner electrode 52 having its lower end closed as at 53 and the spout 54 in this instance being secured to a bushing 55 set in the top 2 by a bayonet slot joint 56 so that it may be removed if desired for filling medicine into the chamber 52 or the spout may be provided with a filling opening 57 closed by a screw cap 58 so that medicine may be filled into the chamber 52 if desired by removing the cap 58. The electric contacts 14 in this case are connected by wires 59 and 60 passing through the cover 2 and connected to the electrodes 51 and 52.

It will be understood that in this last modification, the heating effects take place in practically the same manner as the other forms of this invention by passing from one to the other of the electrodes through the water. In this last form, the apertures 61 and 62 are formed in the outer and inner electrodes near their upper ends so that the steam arising from the water in the outer receptacle may enter and mingle with the vapors arising from the medicine contained in the inner electrode and thus co-mingle with the spout 36.

Having thus described my invention, what I claim as new and desire to secure by Letters Patent is:

1. In an electric vaporizer, the combination with an outer water receptacle, of tubular electrodes mounted one within the other within said receptacle, connections connecting said electrodes to an electric current, means for closing one of said electrodes so that it becomes a receptacle for medicine, and a spout for receiving the discharge of vapor from said medicine receptacle.

2. In an electric vaporizer, the combination with an outer water receptacle, of electric heating elements mounted therein, an inner medicine receptacle having absorbent material, means for causing the steam from the water receptacle to pass through the absorbent material, and a discharge spout receiving the vapors after they pass through the absorbent material.

3. The combination with an outer water receptacle, of a closure cover for the same, nested tubular electrodes pendent from the cover, electric connections, a detachable medicine container secured within the inner tubular electrode and a spout for discharging the vapors from the medicine container.

4. In an electric vaporizer, the combination with an outer water receptacle, of a closure top for the same carrying a spout, a medicine chamber discharging vapor into the spout, a tube in the medicine chamber projecting from near the outside of the chamber at the top to near the bottom at the inside, and a capillary vent for the water chamber for preventing the formation of a vacuum therein on cooling.

5. The combination with an outer receptacle for containing water, of electric heating elements projecting into said receptacle and located one within the other, connections connecting said electrodes to an electric circuit and an independent liquid receptacle within the outer receptacle for containing medicine to be heated by the water in the water receptacle.

6. In an electric vaporizer, the combination with an outer receptacle, of a medicine receptacle mounted therein, means for passing the steam from the water receptacle up through the body of the liquid medicine in the medicine receptacle in the form of bubbles, a spout for receiving the medicine laden vapors from the medicine chamber, and electric heating elements in the water receptacle.

7. In an electric vaporizer, the combination with an outer water receptacle, of a closure top for the same carrying a spout and having a steam vent into the spout, a medicine chamber located in the water chamber and discharging independently into the spout to mix with the steam from the water chamber and heating electrodes in the water chamber.

SAMUEL L. WEISS.